3,444,211
RUTIN TRI(DIHYDROXYPROPYL)ETHERS
Shigeharu Kono and Kunishige Sugiyama, Tokyo, Japan, assignors to Eisai Kabushika Kaisha, Tokyo, Japan
No Drawing. Filed Nov. 28, 1966, Ser. No. 597,235
Int. Cl. C07d 7/38
U.S. Cl. 260—345.2                       1 Claim

ABSTRACT OF THE DISCLOSURE

Novel water-soluble rutin 7,3',4'-tri(dihydroxypropyl) ether and rutin 5,7,4'-tri(dihydroxypropyl)ethers which are used for therapeutical treatment of effusion of blood from the peripheral vascular system, high blood pressure, cerebral hemorrhage and the like. The novel rutin ethers by virtue of their high water solubility are particularly adapted to administration through intraperitoneal injection.

---

This invention relates to a novel rutin derivative, and more particularly, to novel rutin tri(dihydroxypropyl) ethers of this formula:

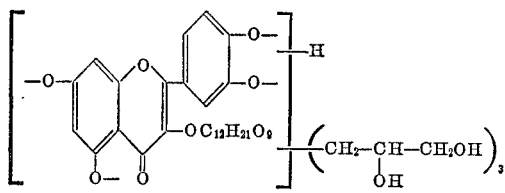

wherein the free —OH group is at 5- or 3'-position.

Rutin as such is known as a substance which shows a remarkable strengthening action on peripheral blood vessels and displays almost no toxic effect on the human body, and thus has heretofore been used universally in therapeutical treatment as a strengthening agent for peripheral vascular system for the purpose of prevention of an effusion of blood from the peripheral vascular system, high blood pressure and cerebral hemorrhage. Since rutin has a considerably low solubility in water, its use as injection, however, is naturally limited.

The present invention has been established as a result of extensive investigation carried out by the present inventors for the purpose of improving the utility of the intrinsic excellent pharmacological activity of rutin by eliminating the abovementioned disadvantage with respect to its solubility in water.

According to the present invention, the almost insoluble rutin is made readily soluble in water by converting the rutin into a rutin tri(dihydroxypropyl)ether possessing an unlimited water solubility.

The strengthening activity on the peripheral vascular system represented by the abovementioned particular rutin derivative according to the present invention was measured by determination of the preventive capacity of blood permeability of the capillary blood vessel as follows:

Variable quantities of rutin tri(dihydroxypropyl)ether as testing specimen were administered into the abdominal cavity of male mice of DD-strain having body-weights ranging from 17 to 23 grams. After 30 minutes, 0.1 ml./ 10 g. of the body weight of trypan blue was administered by intraperitoneal injection. A drop of xylene was immediately dripped to the right ear-lobe and the time required for the commencement of exuding or oozing out of the coloring matter at the region where the xylene had been dripped was noted.

The lasting ratio percent of the time of exuding the coloring matter is represented by the equation:

$$L = \frac{A-B}{B} \times 100$$

wherein:

L=the intended lasting ratio (percent) of the time of duration in seconds for exuding the coloring matter;
A=the time of duration in seconds while the coloring matter exudes from the animals under test; and
B=the time of duration in seconds while the coloring matter exudes from the control animals.

The result of the experiments are tabulated in the following table.

TABLE

| No. of animals | Test sample (compounds) | Dose, mg./kg. | Duration of time up to the commencement of color-exudation (seconds) | L (percent) |
|---|---|---|---|---|
| 15 | Control | | 88.9±4.8 | |
| 15 | Rutin | 100 | 103.0±10.5 | 15.8 |
| 15 | ___do___ | 200 | 119.2±15.7 | 34.0 |
| 15 | Rutin tri-(β-hydroxyethyl) ether. | 200 | 115.7±14.0 | 30.1 |
| 15 | Methylhespyridine. | 100 | 108.5±13.6 | 22.0 |
| 15 | ___do___ | 200 | 134.0±33.3 | 51.4 |
| 15 | Rutin tri(dihydroxypropyl) ether. | 100 | 122.8±17.7 | 38.0 |
| 15 | ___do___ | 200 | 153.9±24.1 | 73.0 |

As is apparent from the data in the above table, the novel compounds of the present invention provide more than two times the strengthening activity on the peripheral vascular system as compared with those of the rutin per se and the known rutin tri(β-hydroxyethyl)ether.

The novel compounds of the present invention may advantageously be prepared, for example, by suspending rutin in water, adding thereto at least more than 3 moles of an aqueous alkaline substance per mole of the rutin, and subjecting the mixture thus obtained to reaction under heat with at least 3 moles of glycerine α-monochlorohydrine. Sodium hydroxide or potassium hydroxide may advantageously be employed as the alkaline substance.

Further, it is found advisable to carry out the abovementioned reaction under a nitrogen atmosphere and at a temperature between room temperature and 90° C. The aqueous solution of the reaction product is acidified under bubbling with gaseous nitrogen. Filtration of the acidic solution is next done in order to remove the solid substances present. The filtrate is then concentrated by evaporation, and there is obtained the contemplated substance. A product of higher purity may be obtained if the filtrate is purified by passage through a set of columns filled respectively with an anionic exchange resin and a cationic exchange resin, prior to concentration thereof by evaporation.

The following example will serve to illustrate the invention.

Example 61 grams of rutin were suspended in 250 ml. of water. The suspension was stirred for 5 hours under bubbling of gaseous nitrogen. To the solution were added 50 ml. of an aqueous solution containing 12.5 grams of caustic soda to dissolve the suspended rutin. After completion of the dissolution of the rutin, there were added dropwise while stirring 35 grams of glycerine α-monochlorohydrine. The whole was then subjected to reaction at a temperature of 75° C. for two hours. The pH value of the reaction mixture was adjusted to 5 by means of an 0.1 normal solution of hydrochloric acid, and the mixture was allowed to stand in an ice box for 2 days. The unreacted rutin which separated was removed by filtration, and the filtrate was then purified by treating it with a set of columns containing respectively an anion exchange resin and a cation exchange resin. By concentrating the purified filtrate, there were obtained 52 grams of a powdery substance having the melting point of about 135° C. The yield corresponds to 63% based on the rutin employed.

The result of elemental analysis of the product: $C_{36}H_{48}O_{22}$, are shown below:

Calculated (percent): C, 51.92; H, 5.77. Found (percent): C, 51.84; H, 5.70.

What is claimed is:

1. Novel rutin tri(dihydroxypropyl)ethers of the formula:

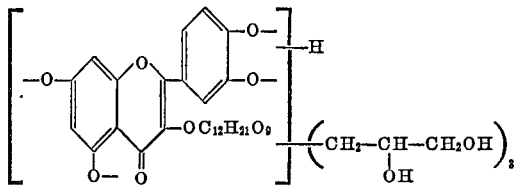

wherein the free —OH group is at 5- or 3′-position.

References Cited

UNITED STATES PATENTS 2,744,920   5/1956   Kurth _____ 260—345.2

HENRY R. JILES, *Primary Examiner.*

J. M. FORD, *Assistant Examiner.*

U.S. Cl. X.R.

260—999